United States Patent [19]
Boles et al.

[11] 3,933,189
[45] Jan. 20, 1976

[54] NOISE REDUCING PLANER CUTTER HEAD

[75] Inventors: Charles L. Boles; Richard J. Flanigan, both of McMinnville, Tenn.

[73] Assignee: Powermatic/Houdaille, Inc., McMinnville, Tenn.

[22] Filed: Sept. 9, 1974

[21] Appl. No.: 504,564

[52] U.S. Cl. ................. 144/117 R; 144/230; 29/105
[51] Int. Cl.² ........................................... B27C 1/14
[58] Field of Search ........ 144/117 R, 230; 29/105 R

[56] References Cited
UNITED STATES PATENTS

| | | | |
|---|---|---|---|
| 2,702,059 | 2/1955 | Ballantine | 144/230 |
| 2,836,206 | 5/1958 | Gaskell | 144/117 R X |
| 2,969,816 | 1/1961 | Johnsa | 144/117 R |
| 3,082,802 | 3/1963 | Dickson et al. | 144/117 R X |

*Primary Examiner*—Harold D. Whitehead
*Assistant Examiner*—James G. Smith
*Attorney, Agent, or Firm*—Hill, Gross, Simpson, Van Santen, Steadman, Chiara & Simpson

[57] ABSTRACT

A noise reducing cutterhead for planers which includes a cylindrical cutterhead member having a plurality of circumferentially spaced axial grooves therein receiving cutter blades, the blades having an axial length less than the length of the cutter head, the blades being spaced from one another in each groove and the blades in successive grooves being staggered in axially offset relationship, the blades being held in place in the cutterhead by a wedge lock member and being adjustably received in the grooves.

8 Claims, 8 Drawing Figures

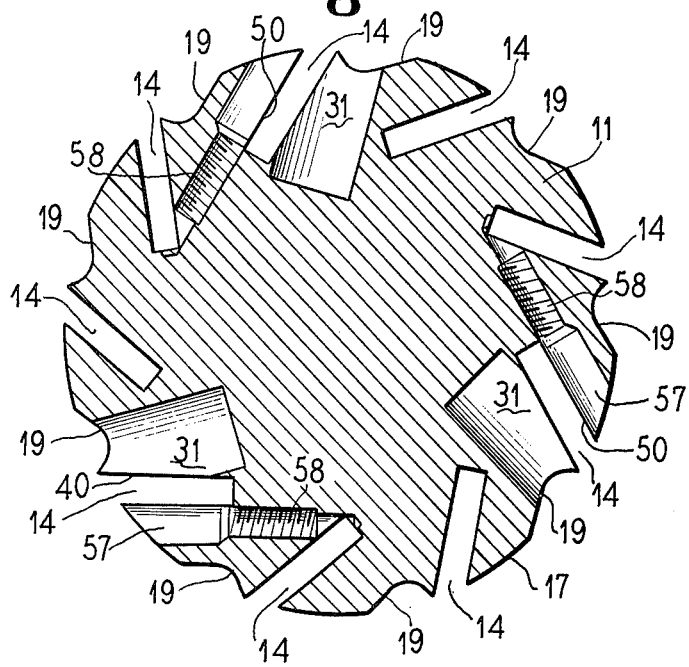
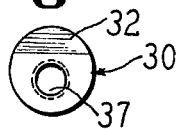
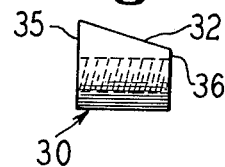
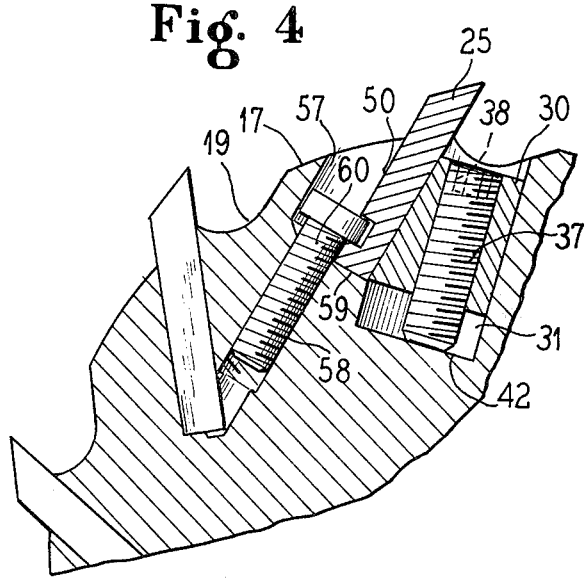
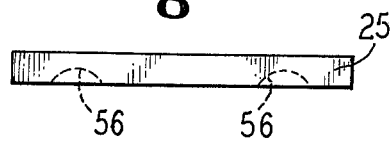
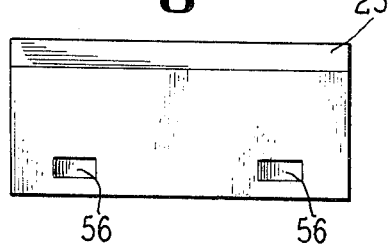

3,933,189

NOISE REDUCING PLANTER CUTTER HEAD

BACKGROUND OF THE INVENTION

1. Field of the Invention

This invention relates to power tools and more particularly to a wood planer cutterhead.

2. Prior Art

Wood planers generally comprise an axially elongated cylindrical cutterhead having one or more blades running the axial length thereof. The cutterhead revolves at relatively high speed with the blade contacting the surface of the wood to be planed. Each time the blade or blades contact the wood surface, considerable noise is created.

Recently, there has been additional emphasis placed upon noise reduction in various types of machinery and in particular with respect to historically high noise level machinery. It has been known to reduce the noise of a planer cutterhead by spiralling the blade on the cutterhead. However, such constructions are quite expensive to manufacture, particularly spiral blades, and, generally they cannot be manufactured in smaller sizes. Thus, spiral cutterheads have found but limited acceptance in the art and then only in connection with relatively large planers.

It would therefore be an advance in the art to find a method of reducing planer cutterhead noise which would be applicable to both small and large width planers and which would be economical to manufacture and operate.

SUMMARY OF THE INVENTION

Our invention provides a noise reducing cutterhead. The basic principle of our cutterhead involves a reduction in the amount of blade contacting the wood at any given instance. However, this is accomplished without reduction of the efficiency of the cutterhead.

Our cutterhead consists of a shaft carried cylinder having a plurality of axially extending circumferentially spaced grooves therein. Because the grooves are axial of the cutterhead, they are relatively inexpensive to machine. Each groove receives a plurality of axially spaced blades, the blades being held in place by a wedge lock and being adjustable by means of an adjustment screw. Adjacent each slot, the cutterhead is formed with a chip breaker.

Because the blades in each slot are axially spaced from one another, less than the full width of the board to be planed is contacted by the blades of each slot. In order to provide full width cutting, the blades in each slot are axially staggered from the blades of the adjacent slots. In this manner, although the blades are straight, the cutterhead can act in the manner of a spiral bladed cutterhead. Tests have shown that a cutterhead constructed according to these principles substantially reduces the noise level encountered with standard heads.

It is therefore an object of this invention to provide an improved planer cutterhead.

It is a further object of this invention to provide a planer cutterhead capable of operating at reduced noise levels while utilizing straight blades.

It is another and more particular object of this invention to provide a planer cutterhead having a plurality of circumferentially spaced rows of blades, with a plurality of axially spaced blades in each row, the blades in adjacent rows being axially offset from one another.

It is yet another and most specific object of this invention to provide a noise reducing, economical planer cutterhead having a plurality of circumferentially spaced axially extending grooves receiving a plurality of axially spaced straight blades, the blades offset from one another in adjacent grooves, the blades being adjustable in the grooves by an adjustment means which aids in maintaining the blades in the slots and wedge shape locking means contacting each blade utilizing centrifugal force to lock the blades in the slots with the cutterhead formed with an integral chip breaker surface configuration.

BRIEF DESCRIPTION OF THE DRAWINGS

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure and in which:

FIG. 3 is a cross sectional view of the cutterhead of FIG. 1 taken along the lines III—III of FIG. 1;

FIG. 4 is a fragmentary enlarged view similar to FIG. 3 with the blades shown received in the slots;

FIG. 5 is an end plan view of a wedge locking device according to this invention;

FIG. 6 is a side plan view of the device of FIG. 5;

FIG. 7 is an end plan view of a blade according to this invention; and

FIG. 8 is a top plan view of the blade of FIG. 7.

DESCRIPTION OF THE PREFERRED EMBODIMENT

Figure 1:
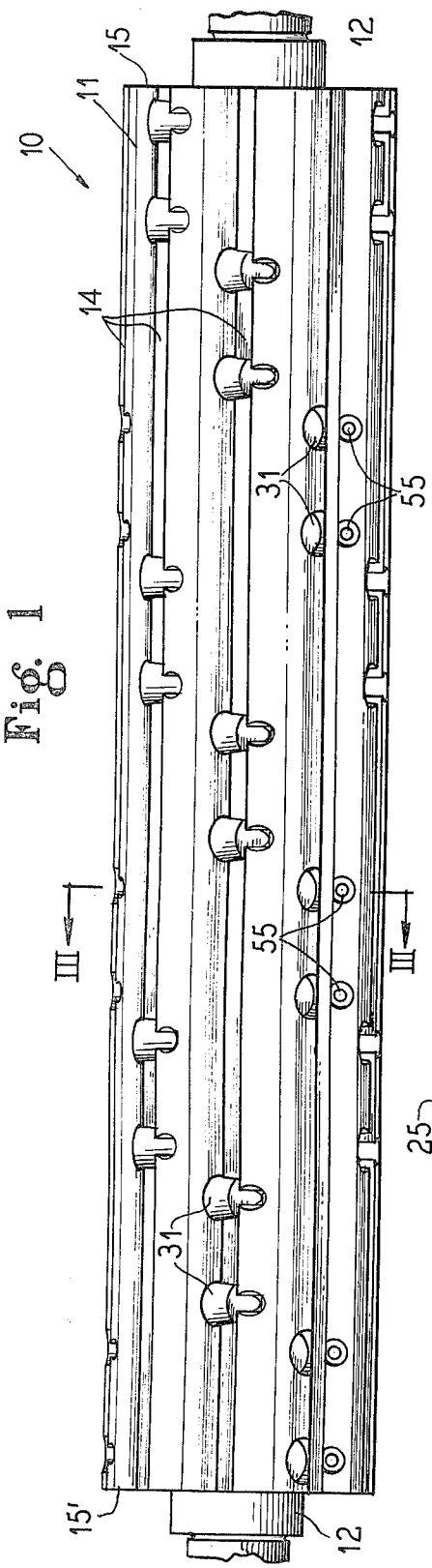
FIG. 1 is a fragmentary plan view of a cutterhead according to this invention without the blades in position.

FIG. 1 illustrates a machine cutterhead according to this invention without the blades and blade adjusting and locking devices inserted. The cutterhead 10 has a cylindrical body portion 11 which is integral with shaft means 12 at either axial end. The shaft means 12 are dimensioned to be received within a planing machine and may, for example, be splined or otherwise keyed to a prime driver. Normally the shafts are bearing supported and the cutterhead in operation will be driven at a high rpm. The cutterhead has a plurality of circumferentially spaced axially extending grooves 14 which extend from end 15 to end 15' of the cylindrical portion 11.

As best illustrated in FIG. 3, the grooves 14 are formed non-radially into the body of the cutterhead and are equally circumferentially spaced around the periphery 17 of the cutterhead. As shown in FIG. 3, clockwise of the grooves and immediately adjacent thereto, the periphery 17 of the cutterhead is formed with chip breaker contours 19. The chip breaker contours comprise shallow groove areas of the periphery extending axially of the cylindrical portion from end 15 to end 15' immediately in front of the grooves 14 in the operating direction of rotation. As illustrated, the chip breaker grooves 19 are curved but are not pure radius depressions in the periphery 17 but taper towards the leading edges thereof.

Figure 2:
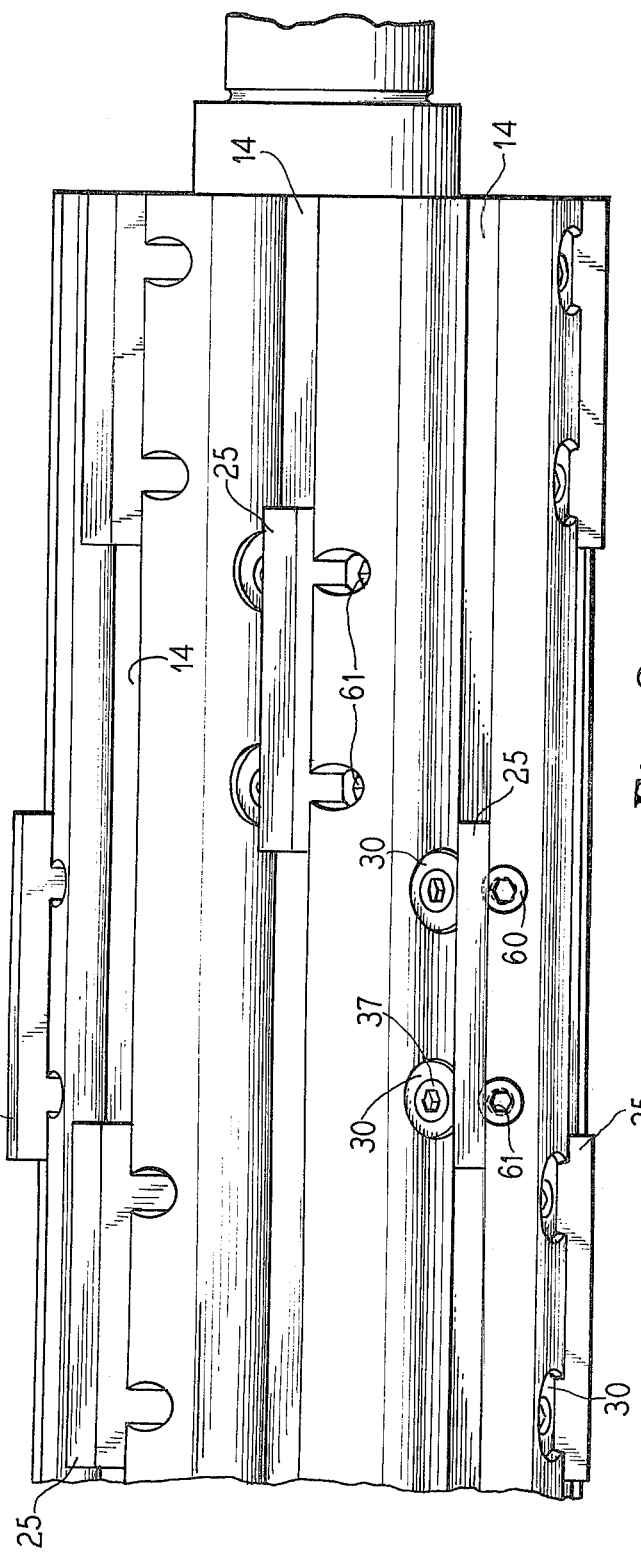
FIG. 2 is a fragmentary view similar to FIG. 1 on an enlarged scale with the blades received in the head.

A plurality of cutting blades 25 are received in the grooves 14. The cutting blades have an axial length less than the axial length of the cylindrical portion 11 and are positioned in each groove 14 in axially spaced relation to one another. In the embodiment illustrated in FIG. 1, three blades will be received in each row and the blades in each row are axially staggered from the blades in the circumferentially adjacent rows. As shown, the axial staggering has been chosen such that the blades will be axially aligned every three rows. For example, in a cutterhead having a cylindrical portion 11 with a length of 18¼ inches and a diameter of 3.62 inches, nine rows may be provided circumferentially. Each row can then receive three 2¼ inch long blades. This provides for a blade overlap as shown in FIG. 2 where the axial end portions of each blade overlap the axial end portions of blades in the circumferentially adjacent rows.

It will be appreciated that the above dimensions, spacings, number of rows or grooves and number of blades illustrate only one embodiment and that other constructions can be used. A principal advantage of this design is that it is adaptable to small cutting circle cutterheads. Prior art noise reducing cutterheads, such as spiral cutterheads, are not adaptable commercially to small cutting circle heads such as for example, those smaller than a five-inch cutting circle. The present invention, however, is usable on considerably smaller cutterheads and, for example, can be used successfully on 3⅛ inch cutting circle heads.

The blades 25 are anchored in place in the grooves 14 by a wedge lock 30. In the embodiment illustrated, two such locks 30 are provided for each blade 25. As best illustrated in FIG. 3, two spaced apart bores 31 are provided circumferentially ahead of each groove 14 at the point where each blade is to be located in the groove. The bores 31 extend into the cutterhead from the periphery thereof in the area of the chip breaker 19 and are formed blind. A wedge lock member 30 is received in each of the bores 31. Each wedge lock member comprises, basically, a cylinder having a flat tapered face 32 cut from the outer surface of the periphery and from one axial end 35 to the other axial end 36. A bore 37 extends through the wedge lock axially thereof and is threaded to receive a bolt 37 as best illustrated in FIG. 5. The bolt 37 may be formed with an Allen wrench end 38. The wedge lock is received in the bore 31 with its large diameter end adjacent the bottom.

It will be noted that the bores 31 intersect the grooves 14 and are formed at an angle to the grooves whereby each bore 31 has a tapered opening 40 at the groove 14. The taper is determined by the difference in the angle of the bore 31 in respect to the angle of the groove 14. The face 32 of the wedge lock is formed at a mating taper. It has been found that a 15° angle is satisfactory to insure a positive wedge lock of the blade in the groove. After insertion of the wedge lock 30 and the blade 25, the bolt 37 is tightened to bottom against the bottom wall 42 of the bore 31 thereby raising the wedge lock 30 towards the periphery 17 of the cutterhead. In this manner, the wedge lock 30 is tightened against the blade 25 forcing the blade against the opposite wall 50 of the groove to lock the blade into the groove. As the cutterhead revolves, centrifugal force will tend to urge the wedge lock 30 further out of the bore 31. This will result in a tightening of the wedge lock maintaining the blade 25 in place. It should be appreciated that because of the mating taper of the face 32 on the wedge lock and the angle of projection of the blade 25 with respect to the bore 31, the wedge lock is effective to lock the blade in place irrespective of the degree of insertion of the blade into the slot. In this manner, it is possible to provide an adjustable blade which can be adjusted inwardly and outwardly in the slot for a greater or lesser amount of blade projection beyond the periphery 17 of the cutterhead. After the blade has been adjusted to its desired amount of projection, the bolt 37 can then be tightened to lock the blade in place by means of the wedge lock 30.

Our invention also provides a method of adjusting the degree of projection of the blade. Circumferentially behind each groove in the area in which a blade is to be placed, a pair of countersunk threaded bores 55 are provided. As can be seen from FIGS. 1 and 2, in our illustrated embodiment, we have chosen to provide the threaded countersunk bores 55 axially aligned with the wedge lock bores 31 to further insure positive lock. The blades, as illustrated by dotted lines in FIG. 7 and as shown in FIG. 8, are provided with radius depressions 56 in one face thereof. In the embodiment illustrated, the radius depressions are in the back face of the blade with regard to the operating rotation of the cutterhead. The countersunk threaded bores 55 are therefore provided circumferentially behind the grooves 14. The bores 55 have a large diameter countersunk portion 57 extending from the periphery 17 to the bottom 59 of the grooves the countersunk portions being open to the back wall 50 of the grooves. The threaded portions extend into the cutterhead from the bottom 59 of the grooves 14 with which they are associated. A headed bolt 60 can then be threaded into the portion 58 with the bolt having a head dimensioned to fill the countersunk portion 57 and index with the radius depressions 56 of the blade. As is shown, the head of the bolt 60 may be provided with an Allen wrench opening 61. Thereafter by threading and unthreading the bolts 60, the blade 25 will be moved inwardly and outwardly with respect to the periphery 17 of the cutterhead. The bolt head also provides a backup to the wedge lock in maintaining the blade in the groove.

The noise reduction of a cutterhead constructed according to the above teachings as compared with a standard cutterhead is relatively large as is shown by the following table which compares a standard non-staggered blade cutterhead with a staggered blade cutterhead constructed according to the above teachings. Each cutterhead was tested at idle and while planing various sizes and types of woods. The planer was set to make a 1/16 inch cut at 25 S.F.M.

TABLE A

|  | Standard Cutterhead | Staggered Blade Cutterhead |
| --- | --- | --- |
| Idle | 79 DbA. | 72 DbA. |
| 1" × 4" pine | 87 DbA. | 83 DbA. |
| 2" × 4" pine | 88 DbA. | 81 DbA. |
| 1" × 6" pine | 93 DbA. | 84 DbA. |
| 2" × 6" pine | 94 DbA. | 85 DbA. |
| 1" × 10" dry ash | 104 DbA. | 90 DbA. |
| 3" × 10" dry oak | 106 DbA. | 90 DbA. |

It can therefore be seen from the above that our invention achieves significant noise reduction without substantially increasing manufacturing costs. In addition, operating advantages can be found in that damage to a single blade would result only in the necessity of replacing a small blade rather than a large blade and, especially when used in connection with wide cutterheads, simplify blade maintenance. Further, because of the use of axially spaced blades in each groove, less than the entire width of the workpiece is contacted at any one time, thus the power requirement can be less than with a non-staggered blade head.

Although the teachings of our invention have herein been discussed with reference to specific theories and embodiments, it is to be understood that these are by way of illustration only and that others may wish to utilize my invention in different designs or applications.

We claim as our invention:

1. A planer cutterhead comprising a cutterhead member having an axially elongated cylindrical portion, the cylindrical portion provided with a plurality of circumferentially spaced blade grooves extending into the cutterhead from the periphery thereof, the grooves extending continuously from adjacent one axial end to adjacent the other axial end, and having a circumferential dimension to receive a cutting blade, a plurality of cutting blades received in each groove in axially spaced relation to one another, the cutting blades in circumferentially adjacent grooves being axially staggered with respect to the blades in adjacent grooves, and means securing the blades in the grooves.

2. The cutterhead of claim 1, wherein the blades in adjacent blade grooves are staggered in a spiral relationship.

3. The cutterhead of claim 2, wherein the outer diameter of the cylindrical portion of the cutterhead has chip breaker grooves formed therein adjacent each blade groove circumferentially ahead of the blade groove in the operating direction of rotation of the cutterhead.

4. The cutterhead of claim 2 wherein wedge locks are provided for each blade, the wedge locks including taper faced plugs received in bores extending into the cutterhead, the bores intersecting with the grooves in the area of each groove receiving a blade, the plugs being selectively adjustable in the bores with a tapered face thereof engaging a blade face to force the blade against an opposite wall of the blade groove.

5. The cutterhead of claim 4, wherein adjusting means are provided for each blade effective to selectively adjust the amount of projection of the blade from the blade groove, the adjusting means including a threaded member received in a threaded bore in the cutterhead, the threaded member operatively coupled with a blade and effective to move the blade both inwardly and outwardly with respect to the periphery of the cylindrical portion.

6. In a planer cutterhead having cutting blades received in a plurality of circumferentially spaced axially continuous grooves, the improvement of providing a plurality of axially spaced apart blades in each groove, the blades in each groove being axially staggered from the blades in adjacent grooves.

7. The improvement of claim 6, wherein the blades in each groove have end portions axially overlapping end portions of blades in adjacent groove.

8. A planer cutterhead comprising a shaft with a cylindrical cutterhead portion operatively connected thereto, the cutterhead portion having an outer diameter, a plurality of circumferentially spaced axial grooves extending continuously into the body of the cutterhead from the outer diameter from adjacent one end of the cylindrical portion to adjacent the other end of the cylindrical portion, a plurality of blade receiving areas axially spaced along each groove, a cutter blade received in each groove at each blade receiving area, each groove having a circumferentially front and a circumferentially back wall, a wedge lock receiving bore extending into the body of the cutterhead from the periphery thereof circumferentially in front of each blade receiving area, intersecting the front wall of the groove at an angle at least one adjusting bore extending into the cutterhead adjacent each blade receiving area, the adjusting bore open to the groove at each blade receiving area at the circumferential back wall of the groove, a chip braking groove extending axially of the cutterhead in the outer periphery of the cylindrical portion thereof circumferentially forward of each groove, a tapered plug received in each wedge lock bore having a face thereof in wedged contact with a blade in the groove, and an adjusting bolt received in each adjusting bore having a head portion thereof projecting into a depression in a back side of a blade, the depression radially overlying opposed axial faces of the head portion, the adjusting bolt effective to adjust the degree of projection of a cutting surface of said blade above the periphery, adjustable means on said tapered plug for selectively urging said plug against a front wall of said blade to wedge the blade against the back wall of the groove, and the blades in each row axially staggered from the blades in adjacent rows.

* * * * *